May 7, 1957     H. W. HEINE     2,791,020
METHOD OF MAKING COMPOSITE FIREPROOF ACOUSTICAL TILE
Original Filed April 12, 1951
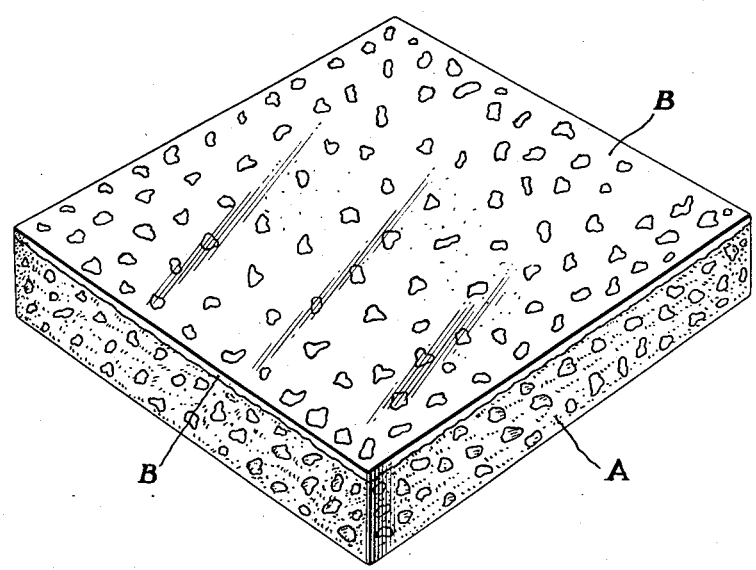
INVENTOR
Henry W. Heine
BY
ATTORNEY

United States Patent Office 2,791,020
Patented May 7, 1957

2,791,020

METHOD OF MAKING COMPOSITE FIREPROOF ACOUSTICAL TILE

Henry William Heine, Washington, D. C.

Continuation of application Serial No. 242,774, April 12, 1951. This application June 29, 1953, Serial No. 364,590

1 Claim. (Cl. 25—156)

This application is a continuation of my copending application Serial No. 242,774, filed April 12, 1951, and now abandoned, and relates to an improvement in fireproof acoustical building tile for walls, ceilings, and the like.

As is well known, acoustical tile made from an earthy or ceramic material, plastic when moist but permanently hard when baked or fired and having a multiplicity of intercommunicating voids or interstices, may be used for acoustical purposes; however, such tile to be acoustically efficient and sound absorbent, must, structurally, be relatively soft or unfused as distinguished from fused or vitrified and therefore, is fragile and readily breaks, crumbles, or chips when handled unless exceptional care is used from the time it is made until the time it is installed.

Attempts have been made to improve the physical strength of tile of this type, especially in enclosing all or a portion of the relatively soft sound-absorbing body with a comparatively thin, hard vitreous skin or surface. However, this type of protection has not proved successful because the surfacing material enters the voids during application and materially reduces the sound absorbing efficiency of the completed tile due to closing or partial closing of all or some of the voids or openings.

Other types of reinforcement have also been tried but so far as is known, none of them have been successful on a commercial scale and the acoustical ceramic tile are today follows largely the pattern of producing simply a relatively soft sound-absorbing body with voids or interstices which is relatively fragile and, therefore, often costly from the standpoint of handling and installation.

Accordingly, a primary object of the invention is to provide a composite acoustical tile having a permanent, relatively soft, sound-absorbing body containing a multiplicity of intercommunicating voids formed by burning out carbonaceous material, and a face, or faces, sides and ends, with a hardened porous surface wherein the pores are maintained open during the firing process to insure communication between the voids or openings of the hardened surface and the relatively soft, sound-absorbing body.

Another object of the invention is to provide a method or methods to produce tile of the type set forth which lends itself to performance on available equipment thereby providing a tile which is competitive commercially with other types not having advantages of the present tile.

By way of example, the product of the invention is shown in the accompanying drawing, in which:

The figure is a perspective view of a tile made in accordance with this invention;

As will be observed from the drawings, the tile of Figure 1 includes a relatively soft porous acoustical body A and a relatively hard or vitreous portion B, the same resulting from firing the same tile at different temperatures.

In general, the process of this invention comprises preparing a mixture of ceramic material and a carbonaceous material. Any ceramic material may be used, including any of the various potters clays or fire clays. Among the usual ceramic clays are shale, diatomaceous earth, silicate clay and kaolin. The carbonaceous material may be the usual materials which can be reduced by burning, such as wood chips, coal granules, either bituminous or anthracite, bagasse, corn cob granules, cellulose fibers, and the like.

The ceramic material is thoroughly mixed with the carbonaceous material and the mixture formed to the sizes and shapes desired, such as of standard tile pieces. The proportions of ceramic to carbonaceous materials may vary in each case and will depend upon the percent of voids desired in the final product. For ordinary purposes, however, a proportion of substantially 50 percent ceramic material to 50 percent carbonaceous material, by volume, is satisfactory. It is to be understood, however, that no specific proportion is critical and the invention is applicable to all relative proportions of ceramic and carbonaceous material.

The formed pieces are then water smoked. The water smoking temperature will vary with the particular type of ceramic material used but will usually be in the range of about 250° to 600° F. The heat is applied until substantially no further steam can be driven off.

The water smoked pieces are then baked to a salmon texture at a higher temperature. For most ceramic clays this temperature should be in the range of about 1200° to 1500° F. During this baking period the carbonaceous material burns out and leaves a friable, fragile, light porous structure. The nature of the reaction is such that the voids of the structure connect with each other, that is, they are intercommunicating.

The baked material is then cooled to about 110° F. and one or more surfaces thereof are coated with a thin layer of different ceramic material, such as kaolin, admixed with a coloring matter and a carbonaceous material. The thin layer should have a thickness of about 1/16 to 1/8 of an inch. The ceramic pieces are then processed through the stages of water smoking and baking as indicated above and finally subject to the fluxing temperature until the added layer becomes fluxed. The withdrawal to a sub-fluxing temperature followed by cooling is then effected.

The effect of the fluxing is to develop a hardened surface layer without substantially affecting the acoustical properties of the tile developed by the burning out of the carbonaceous material. In other words, by fluxing only a thin surface layer of the baked ceramic material, either as such or in the form of an added layer, and quickly cooling it, the interconnecting voids are maintained and, at the same time, the tile is strengthened at the surface, thereby providing an acoustical tile that is resistant to chipping, cracking and breakage generally.

The procedure in which a surface layer is added before fluxing is particularly useful in cases where it is desired to prepare tile with colored surfaces for decorative purposes. It also permits better control of the depth of fluxing by using as the surface layer a ceramic material having a lower fluxing temperature than the filler ceramic material thereby preventing excessive fluxing beyond the thickness of the outer layer.

The following example will disclose the manner in which the invention may be practiced but it is to be understood that these examples are given by the way of illustration only and not by way of limitation.

*Example*

Wet potter's clay is thoroughly mixed in equal volumetric proportions with 1/4" to 1/2" granules of a bituminous coal in a pug mill and extruded therefrom in the form of a ribbon onto a travelling belt where it is cut into pieces of standard size.

The pieces thus formed are then placed in a continuous kiln having a plurality of heating chambers arranged serially.

The embryo tile is heated in the first or water smoking chamber to a temperature of 400° to 550° F. until steam ceases to issue. The pieces are then gradually brought to a temperature of 1200° to 1500° F. in the next or burning chamber and maintained therein until the carbonaceous material is burned out and the clay baked to a soft salmon texture.

The tile pieces are then removed from the kiln and cooled to a temperature of about 110° F. To selected surfaces of the tile pieces there is applied a 1/16" to 1/8" layer of rolled kaolin admixed with coal granules, in equal volumetric proportions, and a pigment. The pieces are then reprocessed to water smoke the applied layers and then baked to a soft salmon texture as in the case of the basic or filler clay material. The baked layers are then subjected to fluxing temperatures and promptly cooled.

From the foregoing, it is believed that it will be apparent that the present invention provides a composite acoustical tile having an unfused body provided with a multiplicity of intercommunicating voids and a relatively hard coating or surfacing also having a multiplicity of voids communicating with each other and also with the voids of the body, the coating adding strength to the body while preserving the acoustical efficiency of the entire tile.

I claim:

A method of manufacturing a composite acoustical tile, comprising, uniformly mixing a ceramic material with a carbonaceous material, forming the resulting mixture into a desired shape, heating the material at a temperature and for a period to effect water smoking thereof, heating the resulting water smoked material at a temperature and for a sufficient period to cause the ceramic material to become baked and the carbonaceous material to become burned and thereby result in the development of a plurality of intercommunicating voids in the baked material, cooling the material and applying to exposed surfaces of the baked material a thin layer of a different ceramic material admixed with a carbonaceous material, heating the resulting body to effect water smoking of the freshly applied layer followed by further heating to bake the layer and cause the carbonaceous material therein to become burned and result in the development of a plurality of voids communicating with the voids of the previously baked ceramic material, subjecting the baked surface layers to heat at its fluxing temperature and maintaining it in contact therewith until said layer becomes fluxed and then promptly removing the material to a temperature below the fluxing point.

References Cited in the file of this patent
UNITED STATES PATENTS

| | | |
|---|---|---|
| 1,742,515 | Mandell | Jan. 7, 1930 |
| 1,925,985 | Coss | Sept. 5, 1933 |
| 1,941,804 | Kern | Jan. 2, 1934 |
| 1,999,371 | Parsons | Apr. 30, 1935 |
| 2,008,718 | Jenkins | July 23, 1935 |
| 2,124,086 | Slidell | July 19, 1938 |